United States Patent
Helfers, III et al.

(10) Patent No.: US 11,758,883 B2
(45) Date of Patent: Sep. 19, 2023

(54) SCENT-BASED TRAINING SYSTEM

(71) Applicant: CANINE DETECTION SERVICES LLC, Green Valley, AZ (US)

(72) Inventors: Frederick Helfers, III, Green Valley, AZ (US); Brian Stearns, Roseville, CA (US)

(73) Assignee: CANINE DETECTION SERVICES LLC, Green Valley, AZ (US)

( * ) Notice: Subject to any disclaimer, the term of this patent is extended or adjusted under 35 U.S.C. 154(b) by 40 days.

(21) Appl. No.: 17/978,812

(22) Filed: Nov. 1, 2022

(65) Prior Publication Data

US 2023/0058034 A1 Feb. 23, 2023

Related U.S. Application Data

(62) Division of application No. 17/123,844, filed on Dec. 16, 2020, now abandoned.

(60) Provisional application No. 62/948,463, filed on Dec. 16, 2019.

(51) Int. Cl.
*A01K 15/02* (2006.01)
*A01K 5/01* (2006.01)

(52) U.S. Cl.
CPC ................ *A01K 15/021* (2013.01); *A01K 5/0114* (2013.01)

(58) Field of Classification Search
CPC ....... A01K 15/021; A01K 5/0114; A01K 5/01; A01K 5/02; A01K 5/0241
See application file for complete search history.

(56) References Cited

U.S. PATENT DOCUMENTS

| | | | | |
|---|---|---|---|---|
| 6,314,911 | B1* | 11/2001 | Kaytovich | A01K 5/0114 119/61.5 |
| 7,654,230 | B2* | 2/2010 | Kroll | A01K 15/021 119/712 |
| 7,856,944 | B1* | 12/2010 | Stauffer | A01K 5/0114 119/61.5 |
| 8,201,522 | B2* | 6/2012 | Kroll | A01K 15/025 119/712 |
| 8,707,900 | B1* | 4/2014 | Womble | A01K 5/02 119/51.5 |
| 8,776,731 | B1* | 7/2014 | Curtis et al. | A01K 15/02 119/720 |
| 10,791,710 | B1* | 10/2020 | White | A01K 5/0114 |
| 2006/0196446 | A1* | 9/2006 | Kates | G01S 1/7038 119/719 |
| 2011/0197819 | A1* | 8/2011 | Montgomery | A01K 5/0291 119/51.11 |

(Continued)

*Primary Examiner* — Trinh T Nguyen
(74) *Attorney, Agent, or Firm* — Grossman, Tucker, Perreault & Pfleger, PLLC

(57) ABSTRACT

The present disclosure is directed to systems and methods for training animals using a wirelessly activated scent-based training system. The scent-based training system includes a reward dispenser that holds a reward. The scent-based training system also includes a scent chamber physically couplable to a target scent reservoir. Target scent molecules flow from the scent reservoir to the interior space of the scent chamber where they may be detected by the animal at which time a reward may be dispensed. The reward passes through the scent chamber prior to being provided to the animal. The reward "pushes" air through the scent chamber prior to passage through the chamber, increasing the concentration of target scent molecules proximate the scent chamber. After passage through the scent chamber a venturi effect created by the reward causes additional target scent molecules to flow from the target scent reservoir to the scent chamber.

10 Claims, 6 Drawing Sheets

(56) References Cited

U.S. PATENT DOCUMENTS

| | | | | |
|---|---|---|---|---|
| 2014/0251234 | A1* | 9/2014 | Deutsch | A01K 15/021 |
| | | | | 340/573.3 |
| 2015/0114301 | A1* | 4/2015 | Nolan | A01K 5/0114 |
| | | | | 119/61.5 |
| 2016/0302383 | A1* | 10/2016 | Frieden | A01K 5/02 |
| 2017/0127647 | A1* | 5/2017 | Owens, III | A01K 5/0114 |
| 2020/0150696 | A1* | 5/2020 | Womble et al. | B64C 39/024 |
| 2021/0289744 | A1* | 9/2021 | Tompkins | A01K 5/0114 |
| 2023/0000055 | A1* | 1/2023 | Ebbers | A01K 15/02 |
| 2023/0032312 | A1* | 2/2023 | Smith | A01K 5/0225 |
| 2023/0037568 | A1* | 2/2023 | Womble et al. | G16H 40/63 |

* cited by examiner

TOP

FRONT

RT SIDE ELEVATION

LEFT SIDE ELEVATION

REAR

BOTTOM

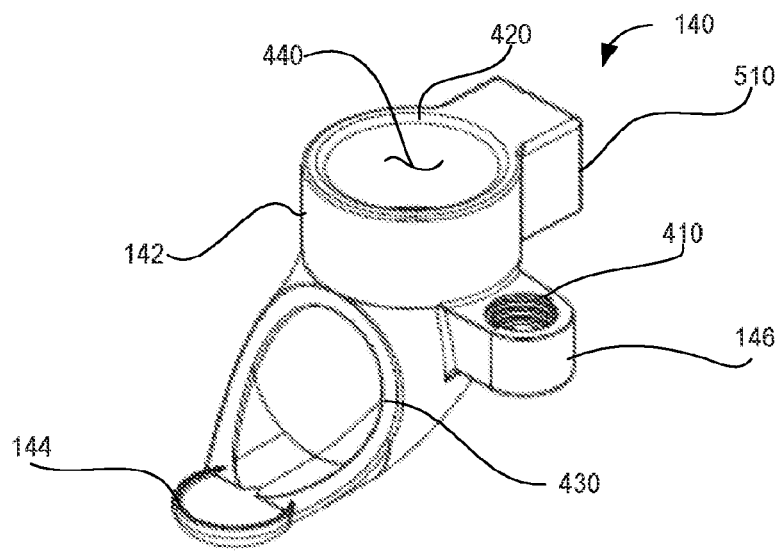
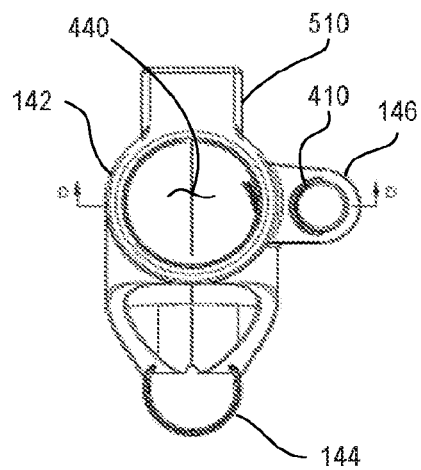
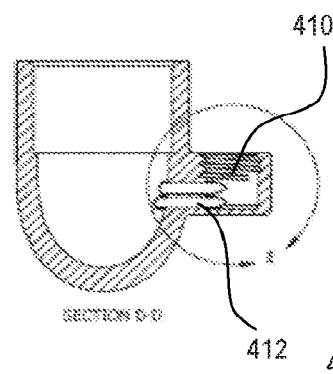
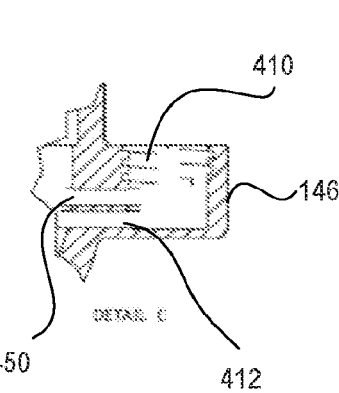
FIG 5A
FIG 5B  FIG 5C  FIG 5D
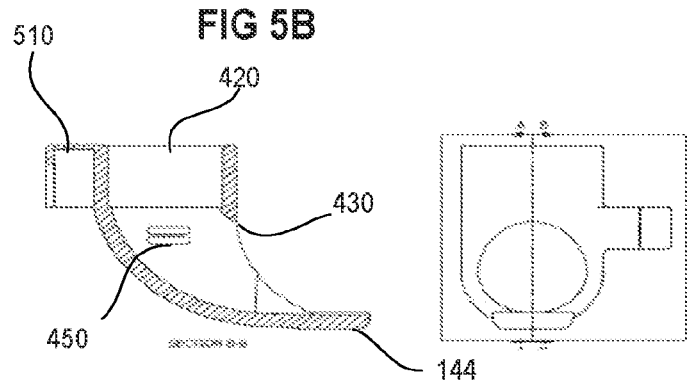
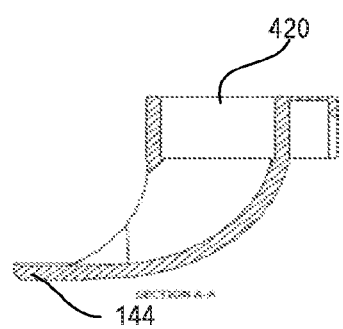
FIG 5F  FIG 5E  FIG 5G

SCENT-BASED TRAINING SYSTEM

CROSS REFERENCE TO RELATED APPLICATIONS

This application is a Division of U.S. Pat. Application 17123844 filed 2020-12-16, and claims benefit of U.S. Provisional Application 62948463 filed 2019-12-16, both of which are incorporated herein by reference in their entirety.

TECHNICAL FIELD

The present disclosure relates to reward dispensing systems, more specifically scent-based reward dispensing systems that minimize external human cueing during training.

BACKGROUND

Animal training systems, such as training systems used with canines frequently employ a training regimen where a reward, such as a treat, is dispensed responsive to the animal performing a desired task or action. (i.e., positive behavioral reinforcement) Traditionally, the individual training the animal would be near the animal and would manually provide the reward to the animal upon successful performance of a desired task or action. Such techniques however permit the unconscious introduction of a human bias into the training process. For example, during canine training, the canine may cue off a subconscious act, movement, or motion performed by the trainer rather than the desired training media. Additionally, since the trainer provides the reward to the animal, the trainer must be proximate the location of the animal when the animal performs the desired task or action. Alternatively, to lessen the influence of the trainer on the animal, the trainer may be remote from the location of the desired task or action performed by the animal and may call or otherwise cause the animal to return to receive the reward, i.e., an "indirect" reward. Such training may introduce a dissociation between the reward and the desired task or action, lengthening and potentially complicating the training process.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

FIG. 5A is a perspective view of another illustrative scent chamber 140 that includes an attachment feature 510 for mounting the scent chamber to a vertical surface, in accordance with at least one embodiment described herein;

FIG. 5B is a plan view of the illustrative scent chamber depicted in FIG. 5A, in accordance with at least one embodiment described herein;

FIG. 5C is a cross-sectional view of the illustrative scent chamber depicted in FIG. 5B along sectional line D-D, in accordance with at least one embodiment described herein;

FIG. 5D is a detail view of the coupling point and fluid conduits of the illustrative scent chamber depicted in FIGS. 5B and 5C, in accordance with at least one embodiment described herein;

FIG. 5E is a front elevation view of the illustrative scent chamber depicted in FIG. 5A, in accordance with at least one embodiment described herein;

FIG. 5F is a cross-sectional view of the illustrative scent chamber depicted in FIG. 5E along sectional line B-B, in accordance with at least one embodiment described herein;

FIG. 5G is a cross-sectional view of the illustrative scent chamber depicted in FIG. 5E along sectional line A-A, in accordance with at least one embodiment described herein.

DETAILED DESCRIPTION

Figure 1:
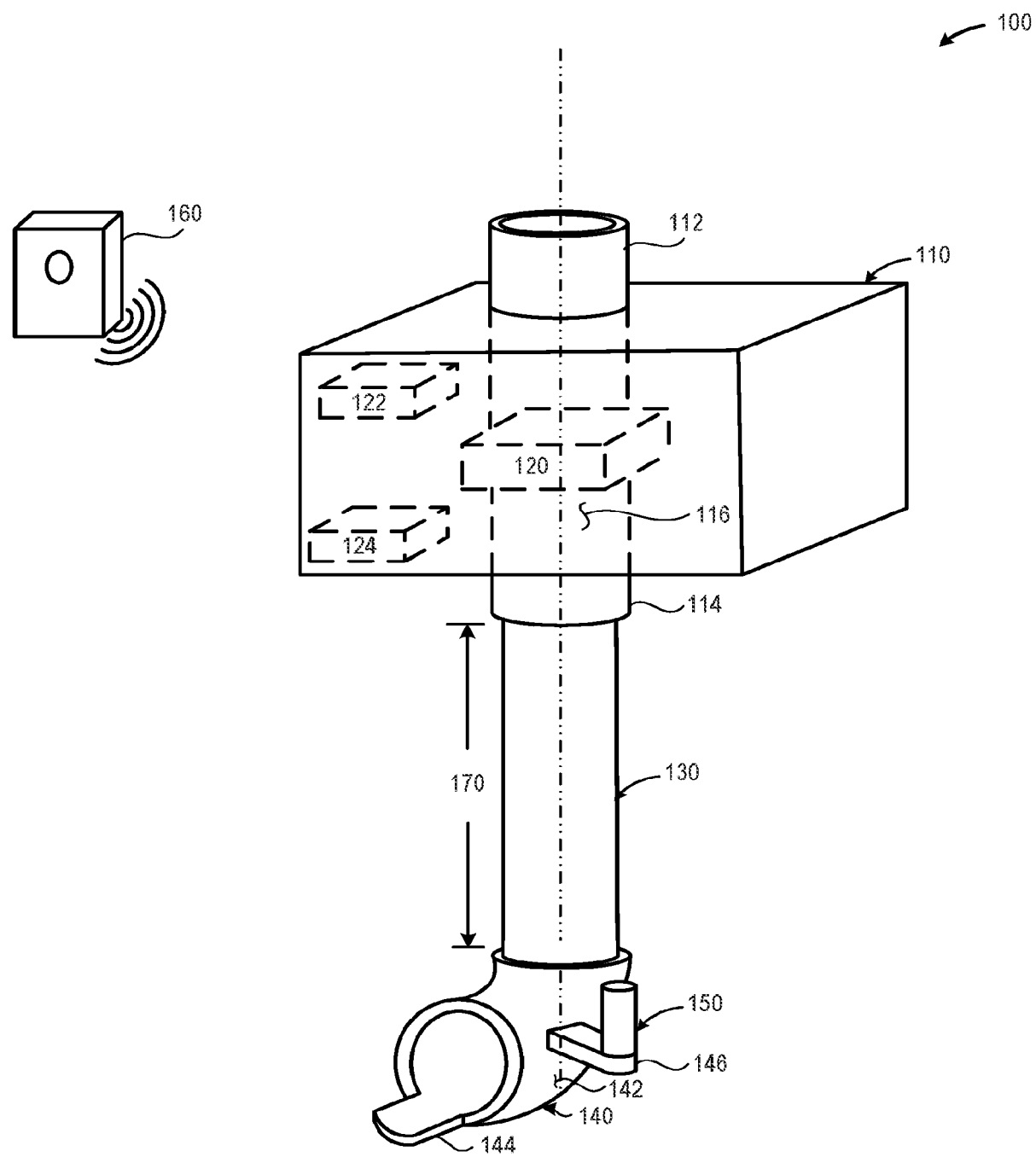
FIG. 1 is a perspective view of an illustrative scent-based training system that includes a reward dispenser, a scent chamber, and an extension tube that physically couples the reward dispenser to the scent chamber, in accordance with at least one embodiment described herein.

Although the following Detailed Description will proceed with reference being made to illustrative embodiments, many alternatives, modifications and variations thereof will be apparent to those skilled in the art.

The systems and methods described herein enhance animal training by permitting the trainer to remain remote from the animal (or even in a different location not observable by the animal) while permitting the remote dispensing of a reward to the animal upon successful performance of a desired task or action. The systems and methods described herein remotely and positively rewards the animal once it has detected a specific target odor source and/or provided a specific behavioral response, at a random distance from the trainer, in a variety of environments with minimal human influence. For example, the systems and methods described herein may beneficially be used to train canines to detect odors or scents such as contraband drugs, explosives, accelerants, electronic devices, biological/medical agents, gases, conservation of wildlife, invasive species plants and/or insects, and similar by allowing a trainer to remotely dispense a reward to the canine when the canine locates a scent and performs a desired action (e.g., sitting, laying, etc.). Since the reward is remotely dispensed proximate the scent, the human influence on the canine is beneficially reduced or even eliminated. Since the reward is provided proximate the scent, the canine beneficially quickly learns the association between a reward and the desired behavior enhancing the speed, accuracy, and consistency of the training. By holding the reward remote from the scent, the animal focuses on the scent and not on the container or device holding the treat, further enhancing the training.

Historically, positive reinforcement trainers who have utilized other prior mechanical devices also incorporate a sound, verbal or voice "cue", mechanical "clicker" or similar forms of "cueing communication." These "cues" ultimately require the animal to focus in part, on the trainer and or be in close proximity to the trainer, which in turn has led to handler dependence by the animal and increases the high probability of trainer induced false responses. Science has demonstrated much of trainer induced behaviors are in fact an unconscious act. (Single blind vs. Double blind testing).

Mechanical training devices that are based on the indirect method of training do little, if any, to build hunt drive and search stamina. Such mechanical training devices utilize food, ball, toy, tug delivery systems that are restricted to only utilize the indirect or alternate reward method by deploying the reward object by a human, drives, mechanical springs, ropes, pulley's and trap doors. Further, such mechanical training devices are generally physically bulky, hard to transport and are not concealable in nature. Most importantly, many require the presentation of the device by a human trainer, there by greatly increasing the potential of initiating unwanted "cueing" during the training phase of the animal. Mechanical training devices are also incapable of delivering a food reward, that can be concealed or hidden and where the food reward is distanced from the "target odor" location. Additionally, many of these mechanical training devices require the physical presentation by the handler of a "box" or a "wall" where in the device is placed and loaded with an object (ball, tug toy).

Mechanical training devices often require "placing" the retrieval toy within the confines of the box, tube or similar device in close proximity to the target scent. This placement also introduces the canine (or animal) to a strong scent of the reward, that identifies to the animal that the "reward" is contained within the box, tube or device. This introduces the strong probability that the animal is now being introduced to another unwanted target odor (ball/ toy) that would require additional training such as "proofing off" or behavior elimination training. Additionally, mechanical training devices are frequently incapable of delivering a food reward that is located or hidden at a distance from the source of the scent.

Some mechanical training devices deliver multiple rewards (e.g., food or treats) using a mechanical conveyance system that encourages the animal to remain at the reward source. Such mechanical training devices are frequently bulky, noisy and not compatible with concealability. The systems and methods disclosed herein use a self- rewarding behavioral sequence that is focused not only on providing a reward, for that exercise, but by making the behavior of the "hunt" itself self- motivating. The systems and methods disclosed herein can deliver just one (reward) at a time, thereby accomplishing the following:

minimizes the effect of the reward scent on the animal's behavior by separating the reward from the target scent allowing the animal to better focus on the target scent;

enhances the animal's hunt drive to search for additional target scent locations by rewarding the animal only once at each scent source training the animal to search for additional scent sources;

builds the animal's hunt drive by encouraging the animal to search for other target scent locations; and builds the trainer's confidence as the trainer observes the animal make a conscious decision to leave a target odor source for which it has just been rewarded and actively "hunt" for other target odor sources.

Some mechanical training devices permit activation independent of the trainer, claiming that such automated activation eliminates the need for the training to have the correct timing of the release of the reward. However, such mechanical training systems may run counter to the understanding that in practical "real world" applications the trainer/animal handler is an integral part of the detection team and the device is as equally important in training of the trainer/animal handler as training the animal. The systems and methods disclosed herein beneficially provide for the training of the trainer/animal handler as an integral part of the detection team.

The systems and methods disclosed herein allows for the canine to respond at the source of the odor and be directly rewarded at the source of the odor, thereby making the odor source highly valuable to the canine. This behavior creates and builds a fundamentally rewarding behavior pattern, one which is highly enhanced through the "Direct Reward" method (associating the target odor source as the source of the reward). The self-rewarding value of the direct reward cannot be understated. The more the dog is exposed to the direct reward method of the present invention, the greater the motivation for the dog to "hunt" for the source of the trained odor.

The physical size and nature of mechanical training devices demonstrate they have minimal portability and as such, are typically used in a defined training environment. In some instances, such as detection dog training, the training occur in varied environments to build the dog's confidence to search in any environment. Mechanical training devices are relatively large, noisy and bulky due to the physical nature of construction and are therefore not typically concealable from the animal. When animals train on the same physical devices, they soon become environmentally conditioned (aware) that these devices represent a form of training or exercise, thus becoming conditioned to certain physical responses that can initiate a negative or unwanted behavior/response.

The systems and methods disclosed herein overcome the limitations of mechanical training devices by being totally portable and concealable. Due to the relatively small size and low weight of the scent-based training systems disclosed herein, they can be hidden and or concealed in a variety of objects, articles and environments. Thus, the scent-based training systems may be placed or concealed within a storage box inside a warehouse, concealed within a trash can in a residential location or placed on a vehicle in a parking lot. Thus, the systems and methods disclosed herein are highly portable and facilitate animal training in a variety of staged and/or real world environments such as interior rooms, different flooring, area sizes, noises, activity, lighting and interior and exterior environments.

Due to their size and/or weight, many mechanical training devices have to be positioned on the ground or in close proximity to the ground. The scent-based training systems disclosed herein may be positioned at a variety of heights from ground level to several feet in elevation, thus providing a basis for the animal to detect and go to a hidden target scent that closely replicates the actual working and/or competition of the animal.

Many mechanical training devices use a food reward delivery system having a food hopper and auger system for reward delivery. These mechanical training devices are typically neither readily portable nor readily concealable. In fact, by design such mechanical training systems encourage the animal to focus on the mechanical training device itself rather than the source of the target scent. Further, by storing a relatively large volume of rewards in a feed hopper, such mechanical training systems encourage the animal to remain at the mechanical training device thereby inhibiting the animals hunt or search drive.

With the onset of the civilian canine detection sports, such as K9 Nosework® and Scentwork, much has been promoted about the utilization of personal companion dogs involved in the sport of scent detection. As such, this has spawned many different varieties of canine detection sports. One aspect of this sport that is highly attractive, is that it is available to all persons and all dogs.

However, persons with disabilities who are physically disabled and confined to a wheelchair or similar devices, or who have mobility problems have found difficulty in being able to reward their dog at the source of the target scent in an effective and timely manner. The systems and methods disclosed herein beneficially permit individuals who wish to pursue the sport of canine detection, to effectively and timely reward their dogs at the source of the target scent, with minimal human involvement thereby enhancing their dogs experience in "The Hunt" but making the game of scent detection a more rewarding exercise for both dog and handler.

The systems and methods disclosed herein are specifically designed to positively reinforce animal behavior ("Hunt Drive") for the identification and detection of trained target scents. The systems and methods disclosed herein, when used for training scent detection animals, beneficially and synergistically train the animals using both operant and classical conditioning. This modality of training creates a strong association between the target scent and the reward in the animal. The systems and methods disclosed herein beneficially employ a direct reward system that taps into the genetic drive of the animal and enhances the hunting and/or searching prowess of the animal, all the while reinforcing search stamina and naturally building a reward pattern of behavior. The systems and methods disclosed herein beneficially permit the trainer to use the scent chamber for imprinting a target scent source and is easily adaptable for training the animal with "proofing" from distracting scents and other unwanted scent sources.

The systems described herein include a reward holder capable of dispensing one or more rewards that drop through a delivery tube and pass through a scent chamber before being accessible to the animal. The scent chamber includes a fluid channel couplable to an externally disposed container having a scent, biological specimen, or similar odor/scent producing material or organism disposed therein. After remote dispensing by the trainer, the reward falls through the closed delivery channel, inducing a flow of air through the channel. The flow of air through the channel expels a relatively concentrated scent from the scent chamber immediately prior to the passage of the reward through the scent chamber. Additionally, the passage of the reward through the scent chamber beneficially introduces a venturi effect that draws additional scent from the scent container. Advantageously, due to the increased scent level detectable by the animal immediately prior to and after the passage of the reward through the scent chamber, the animal is quickly able to build the association between the reward and the scent.

The systems and methods disclosed herein use a direct reward method of training, wherein the animal is allowed to build its hunt drive, build independence from the trainer and search stamina to locate a source of odor, away from the trainer and then receive a positive reward, such as food or a treat, at the odor source. This present invention will build independence from the trainer and minimizes or eliminates trainer/human influence (cueing) on the animal. It is generally accepted that presenting a reward to the animal as quickly as possible after the animal has demonstrated a desired behavior, impacts how quickly and clearly the animal associates the reward with a desired behavior. However, in practical applications and with prior mechanical training devices, it has been demonstrated that a time delay exists between the point in time when the trainer makes a conscious decision to reward the animal and the point in time when the reward is delivered to the animal. This time delay in delivery of the reward to the animal may, at times, cause the animal to be unable to clearly associate the reward with the desired behavior. The systems and methods disclosed herein minimizes or even eliminates such reward delivery temporal delays by allowing the reward to be given to the animal with an instant, rapid response to beneficially enhance the animal's association between the reward and the desired behavior.

As used herein, the terms "scent" and "target scent" refer to any scent, odor, smell, or similar detectable by the olfactory system of an animal. Example materials and substances capable of providing a target scent or odor include but are not limited to: contraband drugs, explosives, accelerants, electronic devices, biological/medical agents, gases, conservation of wildlife, agricultural products, invasive species plants and/or insects.

As used herein, the term "reward" refers to any biologically compatible item consumable by an animal.

FIG. 1 is a perspective view of an illustrative scent-based training system 100 that includes a reward dispenser 110, a scent chamber 140, and an extension tube 130 that physically couples the reward dispenser 110 to the scent chamber 140, in accordance with at least one embodiment described herein. The reward dispenser 110 includes an inlet port 112 and a discharge port 114 from which the reward is dispensed. The reward dispenser 110 includes a moveable or displaceable actuator 120 used to release the reward into the extension tube 130, receiver circuitry 122 to communicate with one or more remote devices 160 and activate the actuator 120, and a power source 124 to provide power to the receiver circuitry 122 and to the actuator 120. When the system user/trainer activates the remote device 160, the actuator 120 is displaced causing the scent-based training system 100 to dispense, via the outlet port 114, one or more rewards pre-loaded into the reward dispenser 110 by the system user/trainer. The scent-based training system 100 may be vertically mounted to a surface prior to use using a hanger bracket, suction cups, or similar devices to permanently or detachably attach the scent-based training system 100 to the surface.

The scent chamber 140 includes a scent chamber body 142 fluidly and physically coupled to a scent reservoir 150 via a hollow conduit 146. The scent reservoir 150 contains a sample of the target scent (e.g., contraband drugs, explosives, accelerants, electronic devices, biological/medical agents, gases, conservation of wildlife, invasive species plants and/or insects). Scent molecules flow by diffusion from the scent reservoir 150 through the hollow conduit 146 and into the scent chamber 140. The scent chamber 140 is disposed a distance 170 from the reward dispenser 110 to isolate the target scent from the scent of the reward held in the reward dispenser 110. The distance 170 is variable based on the length of extension tube 130 used in the scent-based training system 100. In embodiments, the distance 170 may be about: 6 inches or less; 12 inches or less; 18 inches or less; 24 inches or less; 30 inches or less; 36 inches or less; 42 inches or less; 48 inches or less; 54 inches or less; or 60 inches or less. In embodiments, the scent chamber 140 may include a projecting platform 144 or similar structure to capture or slow the velocity of the reward exiting the scent-based training system 100. In embodiments, one or more surface features, such as one or more lips, ridges, raised portions, protrusions, or similar may be disposed across all or a portion of the platform 144. In at least some embodiments, a ridge-like protrusion may extend about the periphery of the upper surface of the platform 144. The scent reservoir 150 fluidly couples to the hollow conduit 146 via one or more fastening systems, such as a threaded connection, a quick-connect connection, a twist-lock connection or similar.

After release by the reward dispenser 110, the reward drops through the extension tube 130. The movement of the reward through the extension tube 130 "pushes" or causes a flow of air ahead of the reward and through the extension tube 130. The flow of air ahead of the reward passes through the scent chamber body 142 displacing additional target scent molecules from the internal space of the scent chamber body 142. The release of additional target scent molecules from the scent chamber 140 provides reinforcement to the animal as the reward is delivered. After passing the location where the hollow conduit 146 couples to the scent chamber body 142, scent chamber 140 functions as an educator, causing the flow of additional target scent molecules from the scent reservoir 150 via a venturi effect. Thus, the animal awaiting the delivery of the reward is beneficially provided additional reinforcement in the form of an increased concentration of scent molecules immediately preceding and immediately after delivery of the reward by the scent-based training system 100.

The reward dispenser 110 includes an actuator 120, a wireless receiver 122, and a power source 124. In embodiments, the actuator, wireless receiver 122, and power source 124 may be disposed at least partially within a housing about the reward dispenser 110. The actuator 120 controls the passage of the reward from the inlet port 112 to the outlet port 114 via conduit 116. In at least some embodiments, the actuator 120 may include a displaceable member, such as a linearly or rotatably displaceable knife gate or slide gate, that at least partially obstructs the conduit 116 such that a reward placed in the inlet port 112 is retained by the actuator 120. The inlet port 112, outlet port 114 and the conduit 116 may each have the same or different physical geometry (e.g., polygonal, circular, oval) and/or dimensions (e.g., inside diameter, outside diameter, or similar principal axis). In embodiments, the inlet port 112 may have an inside diameter of about: 0.5 inches (in) or less; 0.75 in. or less; 1.00 in. or less; 1.25 in. or less; 1.5 in. or less; or 2.00 in. or less. In embodiments, the outlet port 114 may have an inside diameter of about: 0.5 inches (in) or less; 0.75 in. or less; 1.00 in. or less; 1.25 in. or less; 1.5 in. or less; or 2.00 in. or less. In embodiments, the conduit 116 coupling the inlet port 112 to the outlet port 114 may have an inside diameter of about: 0.5 inches (in) or less; 0.75 in. or less; 1.00 in. or less; 1.25 in. or less; 1.5 in. or less; or 2.00 in. or less.

The receiver circuitry 122 includes any number and/or combination of wireless receiver circuits capable of causing the activation of the actuator 120 responsive to receipt of a wireless signal provided by activating a remote control device 160. In embodiments, the receiver circuitry 122 may include one or more radio frequency (RF) receivers. In other embodiments, the receiver circuitry 122 may include one or more Bluetooth® receivers, one or more Near Field Communication (NFC) receivers, one or more ZigBee® receivers, one or more cellular receivers; or combinations thereof. The receiver circuitry 122 may include one or more antennas disposed at least partially within the reward dispenser 110. In some embodiments, the receiver circuitry 122 may include one or more antennas disposed on, about, or across at least a portion of the exterior surface of the reward dispenser. The receiver circuitry 122 may have an effective working range between the remote control device 160 and the reward dispenser 110 of about: 25 feet or less; 50 feet or less; 75 feet or less; 100 feet or less; 250 feet or less; or about 500 feet or less. The receiver circuitry 122 receives power from one or more power sources 124 disposed in, on, or about the reward dispenser 110. In embodiments, the one or more power sources 124 may include one or more primary storage devices (e.g., one or more disposable batteries), one or more secondary storage devices (e.g., one or more rechargeable batteries), one or more ambient energy collection devices (e.g., solar cells) or combinations thereof. In some embodiments, the receiver circuitry 122 may include controller circuitry to control the operation of the actuator 120.

The extension tube 130 couples the reward dispenser 110 to the scent chamber 140. In embodiments, the outside diameter of the extension tube 130 may be approximately equal to the inside diameter of the outlet port 114 such that a first end of the extension tube 130 may be frictionally fitted and retained within the outlet port 114. Friction fitting the extension tube 130 into the outlet port 114 beneficially permits the disassembly of the scent-based training system 100 into component parts for ease of transport and set-up. The extension tube may include a rigid or semi-rigid material such as PVC, CPVC, HDPE, polybutylene, carbon fiber, or similar polymer or plastic materials or steel, aluminum, stainless steel or similar metallic materials. The extension tube 130 may have any inside diameter. For example, the extension tube may have an inside diameter of about: 0.5 inches (in) or less; 0.75 in. or less; 1.00 in. or less; 1.25 in. or less; 1.5 in. or less; or 2.00 in. or less. The extension tube 130 may have any length. For example, the extension tube 130 may have a length of about: 6 inches or less; 12 inches or less; 18 inches or less; 24 inches or less; 30 inches or less; 36 inches or less; 42 inches or less; 48 inches or less; 54 inches or less; or 60 inches or less. In at least some embodiments, the length of the extension tube may be based, at least in part, on the type and/or size of animal trained using the scent-based training system 100. The second end of the extension tube 130 may be frictionally fitted into the scent chamber 140 such that the scent chamber 140 may be selectively disconnected from the extension tube 130.

The first end of the scent chamber 140 is physically couplable to the second end of the extension tube 130. The second end of the scent chamber 140 is open to allow scent molecules to flow from the scent reservoir 150 through the scent chamber body 142 and to the external area about the second end of the scent chamber body 142. The scent chamber 140 includes the hollow scent chamber body 142, the platform 144 disposed proximate the second end of the scent chamber body 142, and the hollow conduit 146. The hollow conduit 146 facilitates the flow of scent molecules from the scent reservoir 150 to the interior of the scent chamber body 142. In some embodiments, the hollow conduit 146 may include an open ended conduit. In other embodiments, one or more apertures, screens or similar devices may be disposed across the hollow conduit 146 to prevent the escape of materials, such as living organisms, from the scent reservoir 150 to the external environment while still permitting the free flow of scent molecules from the scent reservoir 150 to the scent chamber body 142. Although depicted in FIG. 1 as including an approximate 90° bend, the scent chamber body 142 may include a bend having any angle from about 0° to about 90° measured with respect to the longitudinal axis of the extension tube 130.

The scent chamber body 142 may have an inside diameter approximately equal to the external diameter of the extension tube. In embodiments, the scent chamber body may have an inside diameter of about: 0.5 inches (in) or less; 0.75 in. or less; 1.00 in. or less; 1.25 in. or less; 1.5 in. or less; or 2.00 in. or less. In embodiments, the scent chamber body 142 may have a continuous (i.e., unchanging or fixed) inside diameter. In embodiments, the inside diameter of the scent chamber body 142 may taper downwards such that the inside diameter of the second end of the scent chamber body 142 is less than the inside diameter of the first end of the scent chamber body 142. For example, the inside diameter of the second end of the scent chamber body 142 may be about 25% or less; 50% or less; 75% or less; 85% or less; 90% or less; or 95% or less of the inside diameter of the first end of the scent chamber body 142. In embodiments, the inside diameter of the scent chamber body 142 may taper upwards such that the inside diameter of the second end of the scent chamber body 142 is greater than the inside diameter of the first end of the scent chamber body 142. For example, the inside diameter of the second end of the scent chamber body 142 may be about 105% or more; 110% or more; 125% or more; 150% or more; or 200% or more of the inside diameter of the first end of the scent chamber body 142.

The platform 144 may be permanently affixed or detachably attached to the second end of the scent chamber body 142. In embodiments, the platform 144 may include one or more surface features, such as a peripheral ridge, to capture or slow the velocity of the reward exiting the scent chamber 140. In some embodiments, the platform 144 may be formed integral with the scent chamber body 142.

The hollow channel 146 fluidly couples the scent reservoir 150 to the interior space of the scent chamber body 142. Scent molecules flow by diffusion from the scent reservoir 150 into the scent chamber body 142 and exit from the second end of the scent chamber body 142. Increased concentrations of scent molecules may exit the second end of the scent chamber body 142 immediately before and immediately after the passage of a reward through the scent chamber body 142. The hollow channel 146 may be permanently affixed or detachably attached to the external surface of the scent chamber body 142. In some embodiments, the hollow channel 146 may include an open-ended hollow channel. In other embodiments, a perforated member may be disposed across the open portion of the hollow channel 146 to prevent the escape of scent producing materials (e.g., biological specimens such as insects) from the scent reservoir 150. In embodiments, the hollow channel 146 includes an attachment fixture, such as threads, a quick-connect connection, a quarter-turn connection, or a bayonet connection to fluidly couple the scent reservoir 150 to the hollow channel 146.

The scent chamber 140 may be fabricated using any metallic or non-metallic, non-odor absorbing material. Example metallic materials include but are not limited to: carbon steel alloys, stainless steel alloys, aluminum alloys, and similar. Example non-metallic materials include but are not limited to: carbon fiber, PVC, CPVC, HDPE, polybutylene, and similar.

In operation, The encoded handheld RF Transmitter 160 wirelessly communicates a signal to the receiver circuitry 122 when a momentary switch, such as a button [pre-programed A, B, C or D], is activated. The receiver circuitry 122 decodes the received signal causing an movement or displacement of the actuator 120, for example by energizing a coil of a solenoid, causing a piston disposed in the coil to linearly translate, dispensing causing gravity to accelerate the reward downward through the extension tube 130. The downward movement of the reward creates a compression edge of the air in advance of the reward mass. In addition, air also moves behind the falling reward. When the reward reaches the scent chamber 140, the reward passes the opening of the hollow conduit 146. This action draws odor contained scent reservoir 150 to be pulled into the extension tube 130 via the Bernoulli Effect. The reward, along with associated flow of air and scent, is ejected out the front of the scent chamber 140.

Figure 2:
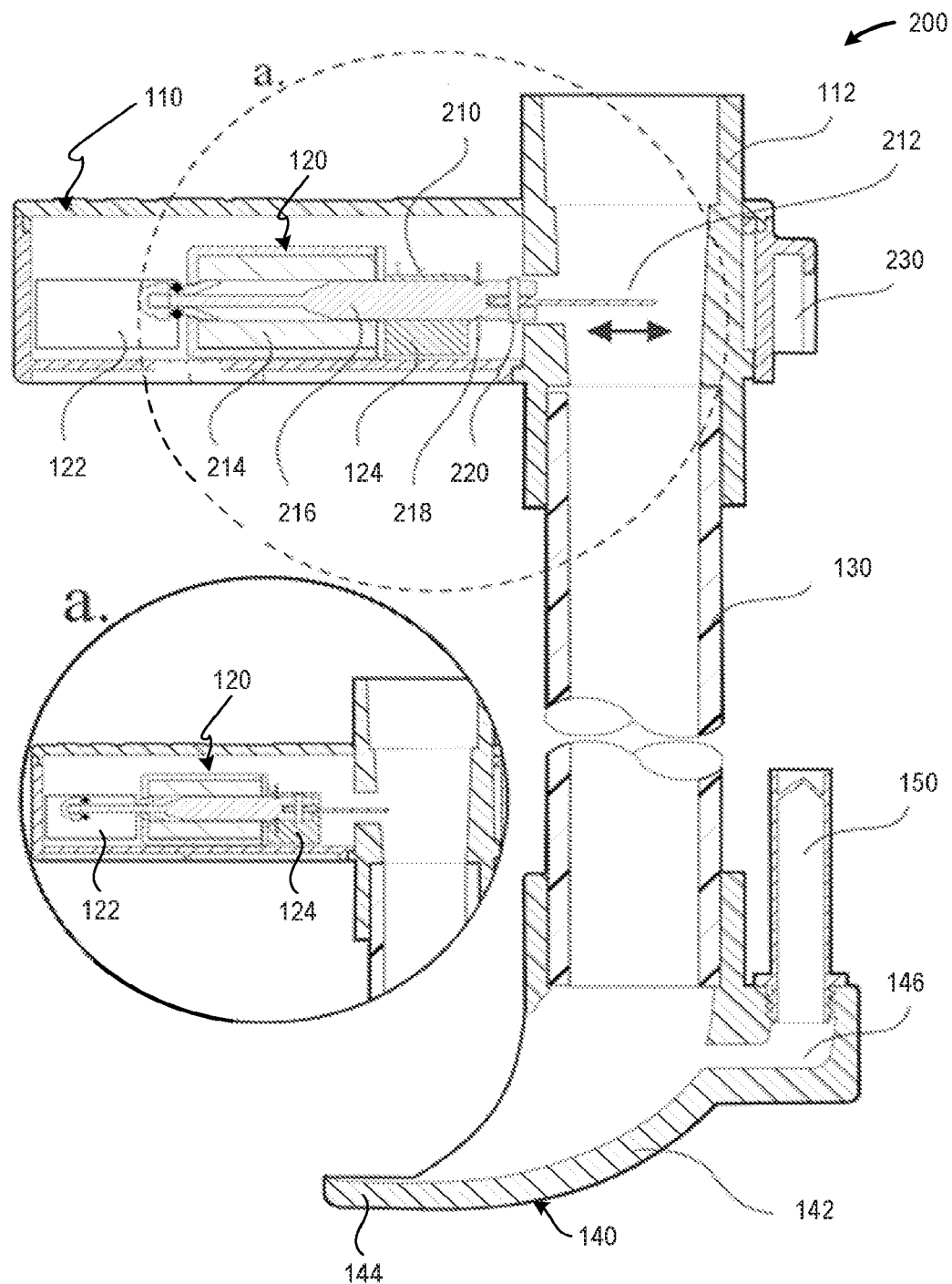
FIG. 2 is a cross-sectional elevation of an illustrative scent-based training system that depicts the internal details of the reward dispenser, in accordance with at least one embodiment described herein.

FIG. 2 is a cross-sectional elevation of an illustrative scent-based training system 200 that depicts the internal details of the reward dispenser 110, in accordance with at least one embodiment described herein. As depicted in FIG. 2, the actuator 120 disposed in the reward dispenser may include multiple components, such as a biasing member 210 used to bias a slide gate member 212 in a first, de-energized, position at least partially obstructing the conduit 116 coupling the inlet port 112 with the outlet port 114. In operation, a reward may be manually positioned on the upper surface of the slide gate member 212 by dropping the reward through the inlet port 112. The actuator 120 may also include a solenoid 214 or similar mechanically displaceable, electrically displaceable, or electromagnetically displaceable device or system that, when activated and/or energized retracts the slide gate member 212 to a second, energized, position that enables a reward previously positioned on the upper surface of the slide gate member 212 to drop through the outlet port 114 into the extension tube 130. As depicted in FIG. 2, the solenoid assembly 214 includes a linearly displaceable piston 216 that is held within the solenoid assembly 214 by a keeper clip 216. A pin 220 physically couples the slide gate member 212 to the linearly displaceable piston 216. The slide gate member 212 is depicted in the actuated or deployed position in FIG. 2 and in the non-actuated or retracted position in Detail "a."

In operation, upon the animal detecting the target scent emitted from the scent chamber 140 and performing the desired action (e.g., an action indicating the source of the target scent such as pointing, sitting, or laying at the source of the target scent), the user releases the reward using the remote device 160. Since the reward is released remotely by the user only after the animal demonstrates the desired behavior, the animal more readily relates the target scent with the provision of the reward, beneficially enhancing the training environment for the animal and potentially leading to more rapid association of the target scent with a reward by the animal.

Upon activating the reward dispenser, the actuator 120 displaces, via the solenoid assembly 214, the slide gate member 212 from the first position (at least partially blocking the conduit 116) to the second position, thereby allowing the reward to drop from the reward dispenser 110 into the extension tube 130. The air pushed ahead of the dropping reward causes an increased flow of scent molecules from the second (open) end of the scent chamber 140, beneficially reinforcing the desired behavior by the animal and reinforcing the association between the scent molecules and the provision of the reward. Advantageously, from the perspective of the animal, human involvement is minimal or non-existent - the only factor associated with the provision of the reward is the detection of the scent molecules by the animal. In addition, the passage of the reward through the scent chamber 140 causes additional scent molecules to flow from the scent reservoir 150 into the scent chamber 140 and out of the second end of the scent chamber 140, providing even further reinforcement to the animal.

Figure 3:
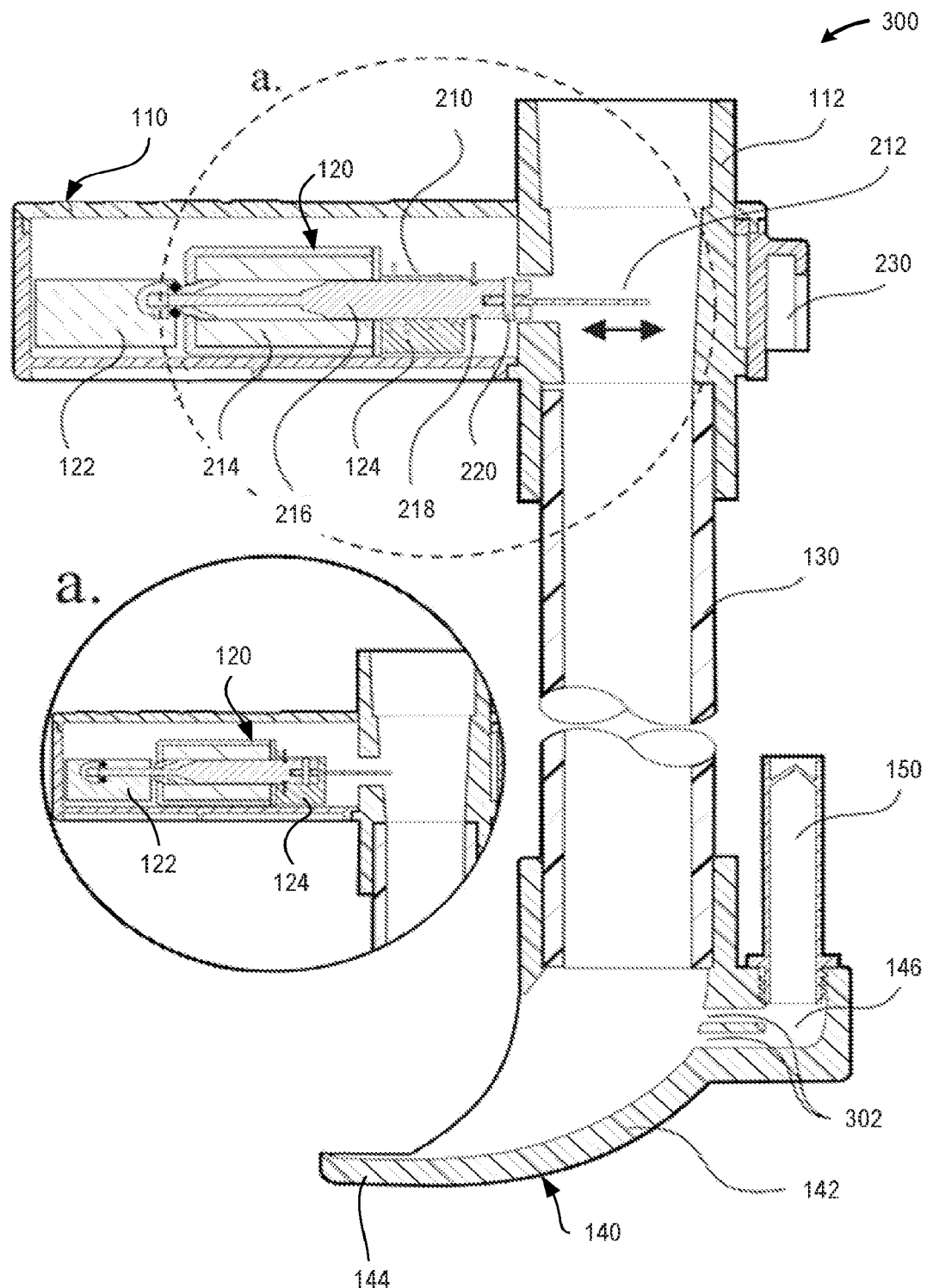
FIG. 3 is a cross-sectional elevation of another illustrative scent-based training system that depicts the internal details of the reward dispenser, in accordance with at least one embodiment described herein.

FIG. 3 is a cross-sectional elevation of another illustrative scent-based training system 300 that depicts the internal details of the reward dispenser 110, in accordance with at least one embodiment described herein. As depicted in FIG. 3, in embodiments, the hollow conduit 146 may include one or more flow slots 302 disposed in at least a portion of the hollow conduit. In other embodiments, a perforated member that includes a number of slots may be disposed across the open portion of the hollow channel 146. In embodiments, the hollow channel 146 may include an attachment fixture, such as threads, a quick-connect connection, a quarter-turn connection, or a bayonet connection to fluidly couple the scent reservoir 150 to the hollow channel 146.

Figure 4A:
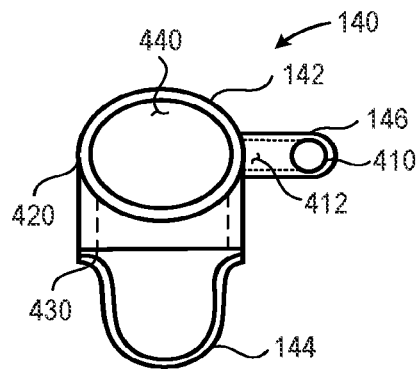
FIG. 4A is a plan view of an illustrative scent chamber, in accordance with at least one embodiment described herein.
Figure 4B:
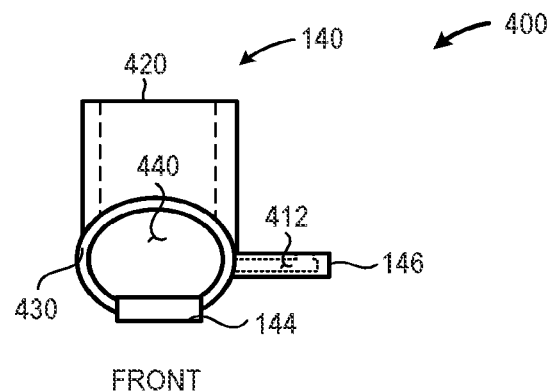
FIG. 4B is a front elevation view of an illustrative scent chamber, in accordance with at least one embodiment described herein.
Figure 4C:
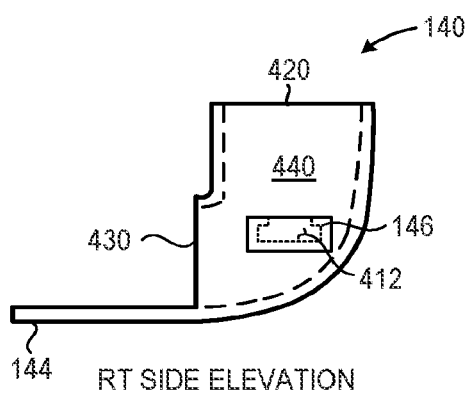
FIG. 4C is a right side elevation view of the illustrative scent chamber depicted in FIG. 3A, in accordance with at least one embodiment described herein.
Figure 4D:
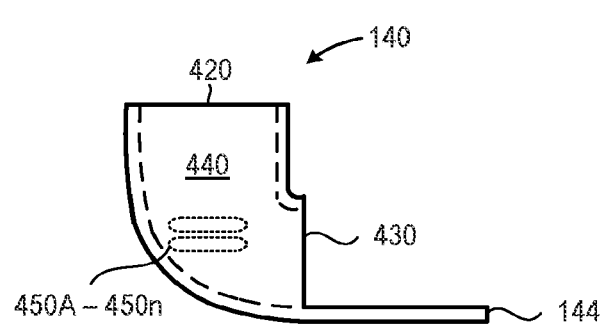
FIG. 4D is a left side elevation view of the illustrative scent chamber depicted in FIG. 3A, in accordance with at least one embodiment described herein.
Figure 4E:
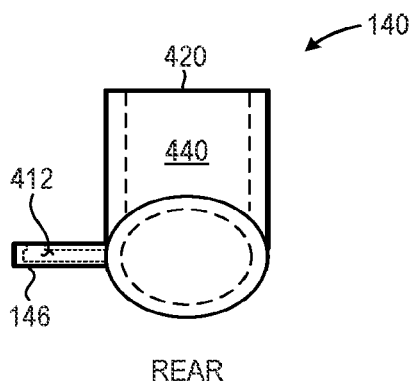
FIG. 4E is a rear elevation view of the illustrative scent chamber depicted in FIG. 3A, in accordance with at least one embodiment described herein.
Figure 4F:
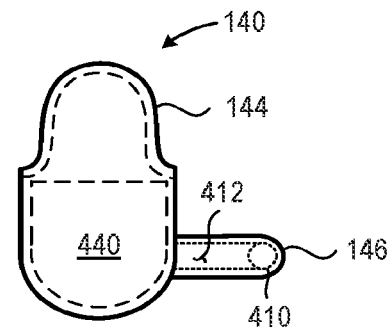
FIG. 4F is a bottom view of the illustrative scent chamber depicted in FIG. 3A, in accordance with at least one embodiment described herein.

FIG. 4A is a plan view of an illustrative scent chamber 140, in accordance with at least one embodiment described herein. FIG. 4B is a front elevation view of an illustrative scent chamber 140, in accordance with at least one embodiment described herein. FIG. 4C is a right side elevation view of the illustrative scent chamber 140 depicted in FIG. 4A, in accordance with at least one embodiment described herein. FIG. 4D is a left side elevation view of the illustrative scent chamber 140 depicted in FIG. 4A, in accordance with at least one embodiment described herein. FIG. 4E is a rear elevation view of the illustrative scent chamber 140 depicted in FIG. 4A, in accordance with at least one embodiment described herein. FIG. 4F is a bottom view of the illustrative scent chamber 140 depicted in FIG. 4A, in accordance with at least one embodiment described herein.

As depicted in FIGS. 4A-4F, the scent chamber 140 includes a first (inlet) end 420 and a second (outlet or discharge) end 430. The hollow channel 146 includes a coupling point 410 for the fluid coupling of a scent reservoir 150 to the scent chamber 140 and a fluid conduit 412 that fluidly couples the scent reservoir 150 to the interior space 440 of the scent chamber 140. The inside perimeter of the scent chamber 140 may have any physical geometry, such as circular (as depicted), oval, polygonal, or combinations thereof.

Referring to FIG. 4D, a plurality of apertures 450A-450n (collectively, "apertures 450") fluidly couple the fluid conduit 412 within the hollow channel 146 to the interior space 440 of the scent chamber 140. In at least some embodiments, a piece of screen or mesh material may provide some or all of the apertures 450.

FIG. 5A is a perspective view of another illustrative scent chamber 140 that includes an attachment feature 510 for mounting the scent chamber 140 to a vertical surface, in accordance with at least one embodiment described herein. FIG. 5B is a plan view of the illustrative scent chamber 140 depicted in FIG. 5A, in accordance with at least one embodiment described herein. FIG. 5C is a cross-sectional view of the illustrative scent chamber 140 depicted in FIG. 5B along sectional line D-D, in accordance with at least one embodiment described herein. FIG. 5D is a detail view of the coupling point 410 and fluid conduits 412 of the illustrative scent chamber 140 depicted in FIGS. 5B and 5C, in accordance with at least one embodiment described herein. FIG. 5E is a front elevation view of the illustrative scent chamber 140 depicted in FIG. 5A, in accordance with at least one embodiment described herein. FIG. 5F is a cross-sectional view of the illustrative scent chamber 140 depicted in FIG. 5E along sectional line B-B, in accordance with at least one embodiment described herein. FIG. 5G is a cross-sectional view of the illustrative scent chamber 140 depicted in FIG. 5E along sectional line A-A, in accordance with at least one embodiment described herein.

Figure 6:
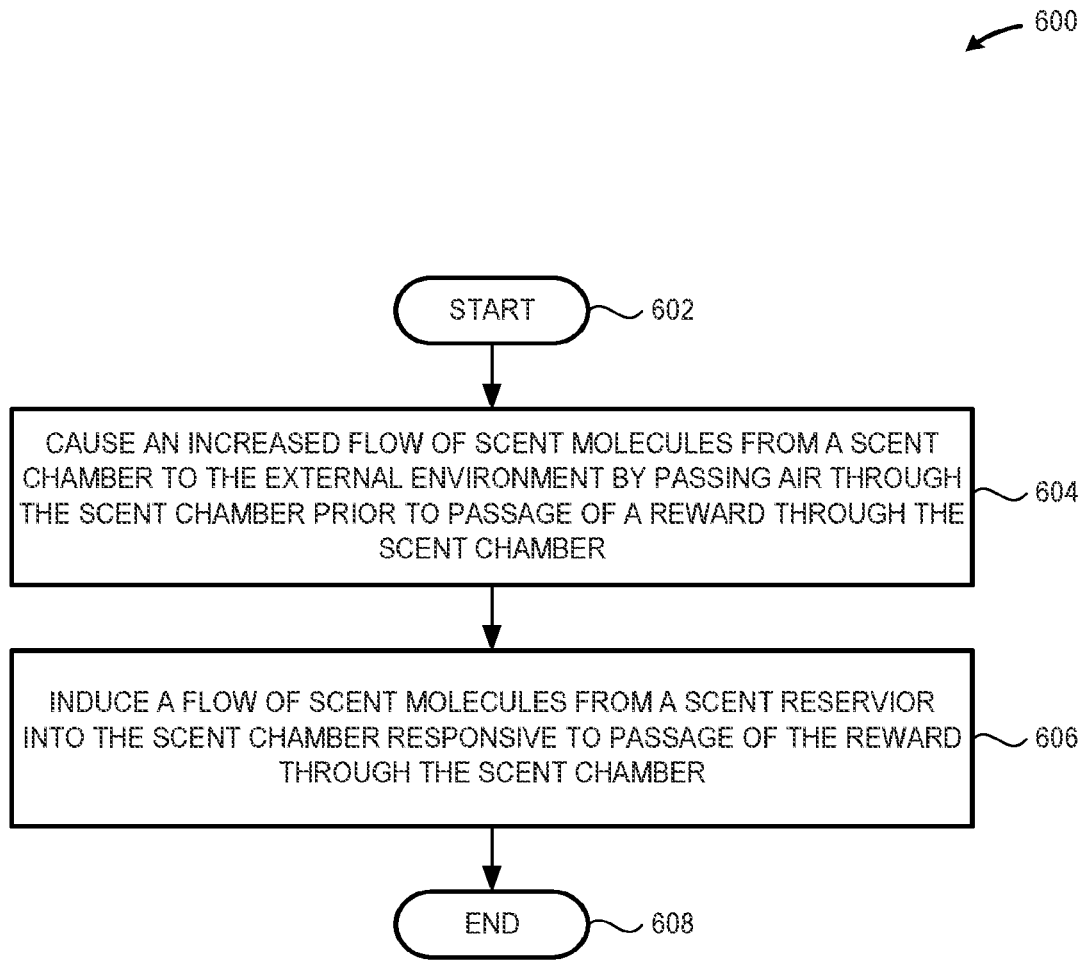
FIG. 6 is a high-level flow diagram of an illustrative scent-based training method making use of the scent-based training system, in accordance with at least one embodiment described herein.

FIG. 6 is a high-level flow diagram of an illustrative scent-based training method 600 making use of the scent-based training system 100, in accordance with at least one embodiment described herein. As discussed above, the scent-based training system 100 separates the reward dispenser 110 (and the reward contained therein) from the target scent chamber 140 to reduce or even eliminate the animal being trained cueing on the reward rather than the target scent. Further the scent-based training system 100 is remotely actuateable by the trainer via wireless remote control to minimize or even eliminate the animal being trained cueing on a conscious or subconscious behavior of the trainer. Also as discussed above, the scent-based training system 100 beneficially reinforces scent-based training by increasing the concentration of target scent molecules in the area surrounding the scent chamber 140 immediately prior to and immediately after delivery of the reward. The method commences at 502 after the trainer has triggered the release of the reward responsive to observing a desired behavior by the animal responding to detecting the target scent.

At 604, as the reward travels downward through the extension tube 130, a small quantity of air is displaced ahead of the reward. This displaced air flushes target scent molecules from the scent chamber 140 immediately prior to delivery of the reward. The increased concentration of target scent molecules proximate the scent chamber 140 beneficially reinforces the association between detection of the scent by the animal, performance of a desired behavior by the animal, and the delivery of the reward to the animal.

At 606, as the reward passes the apertures 450 in the scent chamber 440, slight venturi effect (i.e., Bernoulli effect) is produced, causing additional target scent molecules to flow from the scent reservoir 150, through the hollow channel 146, into the interior space 440 of the scent chamber 140 and exits from the second end 430 of the scent chamber 140. The increased concentration of target scent molecules proximate the scent chamber 140 beneficially further reinforces the association between detection of the scent by the animal, performance of a desired behavior by the animal, and the delivery of the reward to the animal. The method concludes at 608.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

As used in any embodiment herein, the terms "system" or "module" may refer to, for example, software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., nonvolatile) in memory devices.

As used in any embodiment herein, the term "circuitry" may comprise, for example, singly or in any combination, hardwired circuitry, programmable circuitry such as computer processors comprising one or more individual instruction processing cores, state machine circuitry, and/or firmware that stores instructions executed by programmable circuitry or future computing paradigms including, for example, massive parallelism, analog or quantum computing, hardware embodiments of accelerators such as neural net processors and non-silicon implementations of the above. The circuitry may, collectively or individually, be embodied as circuitry that forms part of a larger system, for example, an integrated circuit (IC), system on-chip (SoC), desktop computers, laptop computers, tablet computers, servers, smartphones, etc.

Any of the operations described herein may be implemented in a system that includes one or more mediums (e.g., non-transitory storage mediums) having stored therein, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software executed by a programmable control device.

Thus, the present disclosure is directed to systems and methods for training animals using a wirelessly activated scent-based training system. The scent-based training system includes a reward dispenser that holds a reward that is released from the reward dispenser by an animal trainer responsive to the animal trainer observing a desired behavior based upon the animal's detection of a target scent. The scent-based training system also includes a scent chamber physically couplable to a target scent reservoir. Target scent molecules flow from the scent reservoir to the interior space of the scent chamber where they may be detected by the animal at which time a reward may be dispensed. The reward passes through the scent chamber prior to being provided to the animal. The reward "pushes" air through the scent chamber prior to passage through the chamber, increasing the concentration of target scent molecules proximate the scent chamber. After passage through the scent chamber a venturi effect created by the reward causes additional target scent molecules to flow from the target scent reservoir to the scent chamber. The increase in target scent molecules in and about the scent chamber immediately prior to and immediately after passage of the reward through the scent chamber reinforces to the animal the association of the target scent with the reward. The ability to remotely dispense the reward upon witnessing a desired animal behavior responsive to the animal detecting the target scent beneficially and advantageously minimizes or even eliminates the animal cueing off conscious or subconscious trainer behavior. Disposing the scent chamber remote from the reward dispenser minimizes or even eliminates the animal associating the reward scent, rather than the target scent, in obtaining the reward, further enhancing the association by the animal of the reward with only the target scent.

The following examples pertain to further embodiments. The following examples of the present disclosure may comprise subject material such as at least one device, a method, at least one machine-readable medium for storing instructions that when executed cause a machine to perform acts based on the method of providing a scent-based training system.

According to example 1, there is provided a scent-based training apparatus. The apparatus may include: a reward dispenser to hold one or more rewards, the reward dispenser including: an inlet port; an outlet port; a conduit physically coupling the inlet port to the outlet port; a wirelessly, remotely, actuatable member that, in a first position, obstructs at least a portion of the conduit and in a second position, does not obstruct the conduit, the actuatable member to release the one or more rewards from the outlet port of the reward dispenser; a scent chamber remotely mountable and physically couplable to the reward dispenser, the scent chamber comprising: a first, inlet, end to receive the reward from the reward dispenser; a second, outlet, end to discharge the reward; and a hollow channel having a first end physically couplable to a scent reservoir and a second end physically coupled to the scent chamber, the hollow channel to physically and fluidly couple the scent reservoir to an interior space of the scent chamber such that scent molecules diffuse from the scent reservoir into the scent chamber.

Example 2 may include elements of example 1 and the apparatus may additionally include: a hollow extension tube conduit having a first end and a second end, the first end of the extension tube to physically couple to the outlet port of the reward dispenser and the second end of the extension tube to physically couple to the first end of the scent chamber.

Example 3 may include elements of any of examples 1 or 2 where the reward dispenser further includes: a linearly displaceable solenoid physically coupled to the actuatable member; wireless receiver circuitry conductively coupled to the linearly displaceable solenoid, the wireless receiver circuitry to cause the solenoid to displace the actuatable member from the first position to the second position responsive to receipt of a wireless RF signal from a remote transmitter device; and a power source conductively coupled to the linearly displaceable solenoid and the wireless receiver circuitry.

Example 4 may include elements of any of examples 1 through 3 where the linearly displaceable solenoid further includes: a biasing element to bias the actuatable member in the first position.

Example 5 may include elements of any of examples 1 through 4 where the scent chamber further includes: a plurality of apertures fluidly coupling the hollow channel to the interior space of the scent chamber.

Example 6 may include elements of any of examples 1 through 5 where the first end of the hollow channel further comprises a threaded scent reservoir connection.

Example 7 may include elements of any of examples 1 through 6 where the scent chamber further comprises a platform disposed proximate the second end of the scent chamber.

Example 8 may include elements of any of examples 1 through 7 where the first end of the extension tube to frictionally couple to the outlet port of the reward dispenser; and where the second end of the extension tube to frictionally couple to the first end of the scent chamber.

Example 9 may include elements of any of examples 1 through 8 where the extension tube comprises a hollow cylindrical member having a length measured along a longitudinal axis of greater than 18 inches.

According to example 10, there is provided a scent-based training method. The method may include: causing an increased flow of target scent molecules from a scent chamber to an external environment about the scent chamber by passing a flow of air through the scent chamber prior to passage of a reward through the scent chamber; and inducing a flow of the target scent molecules from a scent reservoir to the scent chamber responsive to passage of the reward through the scent chamber.

According to example 11, there is provided a scent-based training system. The system may include: means for causing a reward to flow through a scent chamber responsive to receipt of at least one wireless signal; means for causing an increased flow of target scent molecules from a scent chamber to an external environment about the scent chamber by passing a flow of air through the scent chamber prior to passage of a reward through the scent chamber; and means for inducing a flow of the target scent molecules from a scent reservoir to the scent chamber responsive to passage of the reward through the scent chamber.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

What is claimed:

1. A scent-based training apparatus, comprising:
    a reward dispenser to hold one or more rewards, the reward dispenser including:
        an inlet port;
        an outlet port;
        a conduit physically coupling the inlet port to the outlet port;
        a wirelessly, remotely, actuatable member that, in a first position, obstructs at least a portion of the conduit and in a second position, does not obstruct the conduit, the actuatable member to release the one or more rewards from the outlet port of the reward dispenser;
    a scent chamber remotely mountable and physically couplable to the reward dispenser, the scent chamber comprising:
        a first, inlet, end to receive the reward from the reward dispenser;
        a second, outlet, end to discharge the reward; and
        a hollow channel having a first end physically couplable to a scent reservoir and a second end physically coupled to the scent chamber, the hollow channel to physically and fluidly couple the scent reservoir to an interior space of the scent chamber such that scent molecules diffuse from the scent reservoir into the scent chamber.

2. The scent-based training apparatus of claim 1, further comprising:
    a hollow extension tube conduit having a first end and a second end, the first end of the extension tube to physically couple to the outlet port of the reward dispenser and the second end of the extension tube to physically couple to the first end of the scent chamber.

3. The scent-based training apparatus of claim 1 wherein the reward dispenser further comprises:
    a linearly displaceable solenoid physically coupled to the actuatable member;
    wireless receiver circuitry conductively coupled to the linearly displaceable solenoid, the wireless receiver circuitry to cause the solenoid to displace the actuatable member from the first position to the second position responsive to receipt of a wireless RF signal from a remote transmitter device; and
    a power source conductively coupled to the linearly displaceable solenoid and the wireless receiver circuitry.

4. The scent-based training apparatus of claim 3 wherein the linearly displaceable solenoid further comprises:
    a biasing element to bias the actuatable member in the first position.

5. The scent-based training apparatus of claim 1 wherein the scent chamber further comprises:
    a plurality of apertures fluidly coupling the hollow channel to the interior space of the scent chamber.

6. The scent-based training apparatus of claim 1 wherein the scent chamber further comprises:
    one or more slots fluidly coupling the hollow channel to the interior space of the scent chamber.

7. The scent-based training apparatus of claim 1 wherein the first end of the hollow channel further comprises a threaded scent reservoir connection.

8. The scent based training apparatus of claim 1 wherein the scent chamber further comprises a platform disposed proximate the second end of the scent chamber.

9. The scent-based training apparatus of claim 2:

wherein the first end of the extension tube to frictionally couple to the outlet port of the reward dispenser; and wherein the second end of the extension tube to frictionally couple to the first end of the scent chamber.

10. The scent-based training apparatus of claim 2: wherein the extension tube comprises a hollow cylindrical member having a length measured along a longitudinal axis of greater than 18 inches.

\* \* \* \* \*